United States Patent [19]

Horikoshi et al.

[11] Patent Number: 4,484,653
[45] Date of Patent: Nov. 27, 1984

[54] AUTOMATIC DRIVING WHEEL CHANGE-OVER APPARATUS

[75] Inventors: Shigeru Horikoshi, Mito; Tatsunori Sakaguchi, Katsuta, both of Japan

[73] Assignee: Hitachi, Ltd., Tokyo, Japan

[21] Appl. No.: 387,208

[22] Filed: Jun. 10, 1982

[30] Foreign Application Priority Data

Jun. 12, 1981 [JP] Japan .................................. 56-89637

[51] Int. Cl.³ ....................... B60Q 1/00; B60K 31/00
[52] U.S. Cl. .................................... 180/233; 180/197; 324/161; 364/426
[58] Field of Search ...................... 180/233, 197, 247; 364/426, 424.1; 361/238, 242; 340/52 R; 324/160, 161

[56] References Cited

U.S. PATENT DOCUMENTS

| | | | |
|---|---|---|---|
| 3,893,535 | 7/1975 | Burckhardt et al. | 180/197 |
| 4,047,601 | 9/1977 | Fogelberg et al. | 180/233 |
| 4,086,563 | 4/1978 | Bachman | 180/197 |
| 4,312,249 | 1/1982 | Hau et al. | 364/426 |
| 4,417,641 | 11/1983 | Kageyama | 180/233 |

Primary Examiner—Joseph F. Peters, Jr.
Assistant Examiner—Donn McGiehan
Attorney, Agent, or Firm—Antonelli, Terry & Wands

[57] ABSTRACT

An automatic driving wheel change-over apparatus designed to automatically effect a change-over between two wheel drive mode and the four wheel drive mode of a vehicle in accordance with the surface conditions of a road. When the difference in speed between the front and rear wheel exceeds a predetermined value during the two wheel drive, a clutch is operated for a predetermined time $TM_0$, and when the clutch is operated more than four times during a predetermined time $TI_0$ which is longer than the time $TM_0$, the clutch is operated continuously for a predetermined time $TH_0$ which is longer than the time $TM_0$ thereby holding the vehicle in the four wheel drive mode.

3 Claims, 6 Drawing Figures

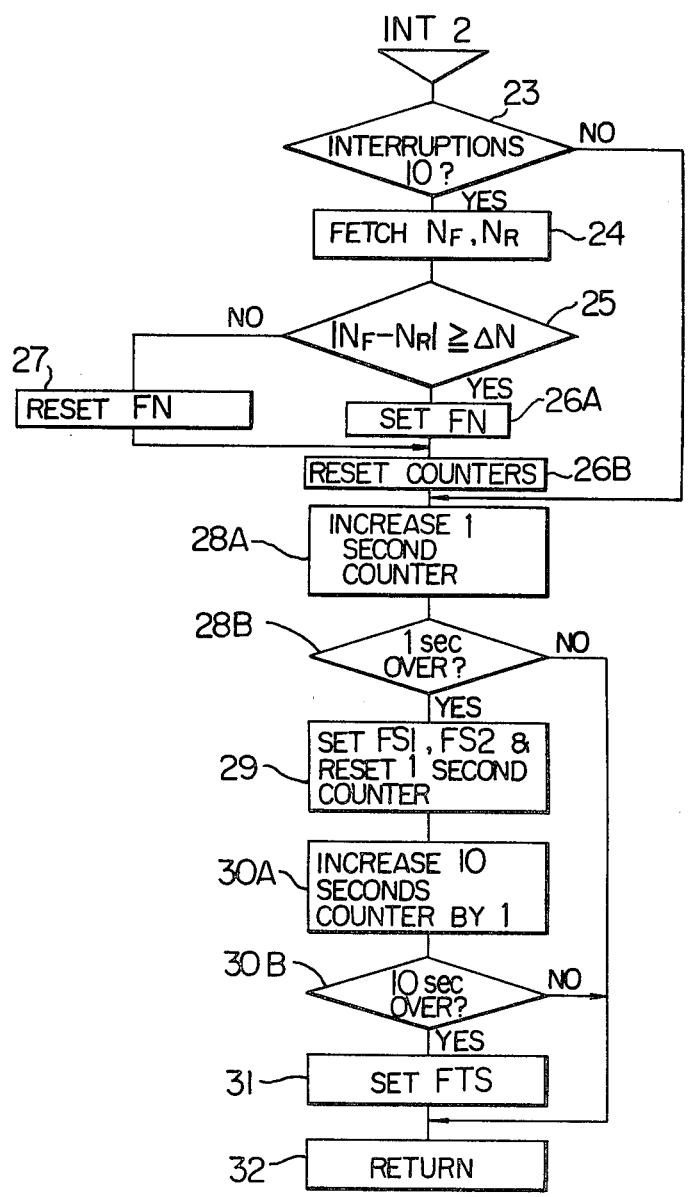

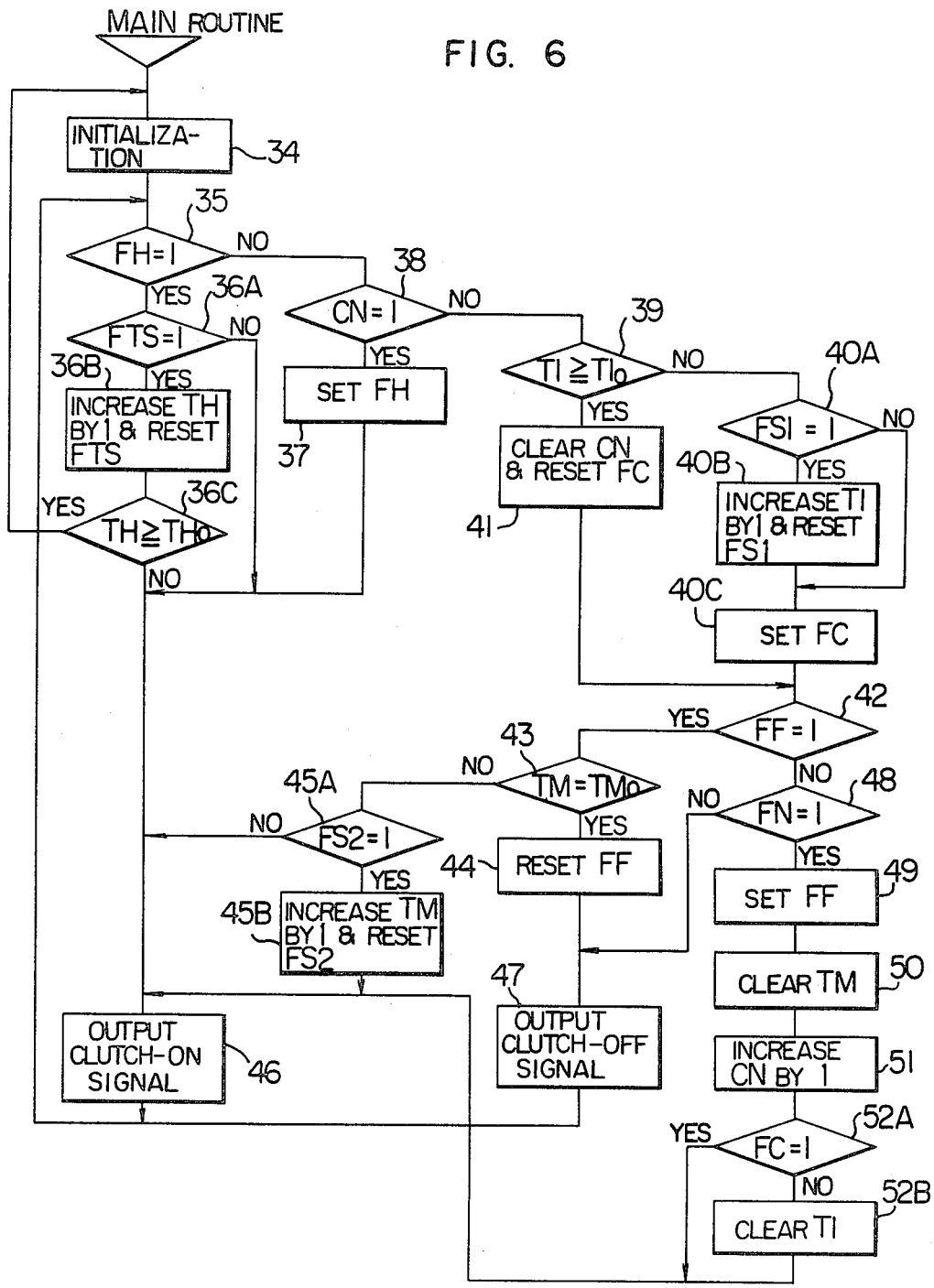

AUTOMATIC DRIVING WHEEL CHANGE-OVER APPARATUS

BACKGROUND OF THE INVENTION

The present invention relates to an automatic driving wheel change-over apparatus and, more particularly, to an apparatus for automatically effecting a change-over between a two wheel drive mode and a four wheel drive mode of a vehicle in accordance with the surface conditions of a road.

In the case of four wheel drive vehicles which have been used widely, the change-over between the two wheel drive mode and the four wheel drive mode is accomplished manually so that the driver must make a skilled judgement in accordance with the road surface condition, and the judgement and the corresponding operation are troublesome.

A vehicle has been disclosed in Japanese Patent Kokai (Laid-Open) No. 148,622/80 wherein, when a slip is detected during the operation, the drive of the vehicle is changed over automatically to the four wheel drive mode and the drive is changed back to the two wheel drive mode upon a disaperance of the detected operation condition.

In the case of ordinary automotive vehicles, for ease in driving it is desirable that a vehicle is capable of and automatic change-over between the four wheel drive mode and the two wheel drive mode while in operation. Thus, a control system is conceivable in which a vehicle is basically operated in the two wheel drive mode so that when the difference in number of revolutions between the front and rear wheels exceeds a predetermined value, it is determined that a slip is developed and the road surface is bad, thereby causing the vehicle to be operated the four wheel drive mode for a predetermined period of time. However, this system is disadvantageous in that, when the vehicle is running on a long snow-covered road, gravel road or the like, the change-over between the two wheel drive mode and the four wheel drive mode is repeatedly effected so that the clutch is thermally overloaded and the wear of the clutch increases thereby reducing the life of the clutch is reduced.

SUMMARY OF THE INVENTION

It is the primary object of the present invention to provide an automatic change-over apparatus for vehicles in which the change-over between the two wheel drive mode and the four wheel drive mode is automatically effected in accordance with the road surface conditions and the number of occurrences of the change-over is reduced as much as possible, thereby protecting the clutch and improving the drivability and running characteristic of the vehicle.

To accomplish the above object and other equally important objects, in accordance with the invention there is provided an automatic driving wheel change-over apparatus for a four wheel drive vehicle capable of automatically effecting the change-over between the four wheel drive mode and two wheel drive mode through the control of the clutch. The apparatus comprises a front wheel speed sensor for detecting the number of revolutions of the front wheels, a rear wheel speed sensor for detecting the number of revolutions of the rear wheels, a control unit and a clutch for effecting the change-over between the two wheel drive mode and the four wheel drive mode, whereby the control unit engages the clutch so as to operate the vehicle in a four wheel drive mode for a given period of time when the difference in speed between the front and rear wheels obtained from the outputs of the front wheel speed sensor and the rear wheel speed sensor exceeds a given value, and the control unit also memorizes the number of times of change-over operation of the clutch in a given time interval longer than the given time period to continuously hold the clutch in the coupled position when the number of times of the change-over operation exceeds a given number.

BRIEF DESCRIPTION OF THE DRAWINGS

FIG. 4 to 6 are flow charts showing the operation flow of the microcomputer.

DESCRIPTION OF THE PREFERRED EMBODIMENT

Figure 1:
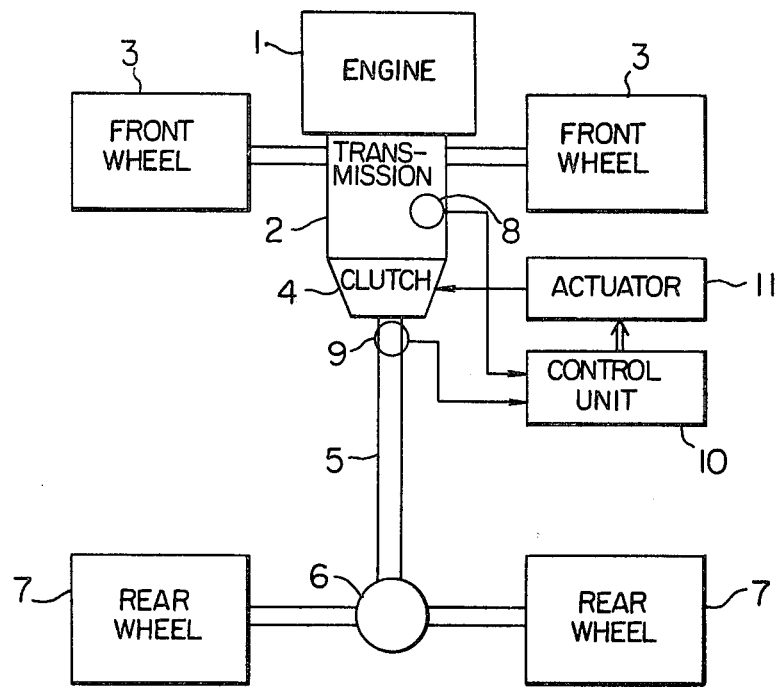
FIG. 1 is a schematic diagram of an embodiment of an automatic driving wheel change-over apparatus according to the present invention.

Referring now to the drawings wherein like reference numerals are used throughout the various views to designate like parts and, more particularly, to FIG. 1, according to this figure, a driving force of an engine 1 rotates front wheels 3 of a vehicle through a transmission 2 with the front wheel drive constituting a basic operation mode of the vehicle. The driving force of the engine 1 rotates a shaft 5 by way of the transmission 2 and a clutch 4 for change-over between the two wheel drive mode and the four wheel drive mode, and the rotation of the shaft 5 rotates rear wheels 7 by way of a differential gear 6. The number of revolutions of the front wheels 3 is detected by a front wheel speed sensor 8 and the number of revolutions of the rear wheels 7 is detected by a rear wheel speed sensor 9. The outputs of the front wheel speed sensor 8 and the rear wheel speed sensor 9 are supplied to a control unit 10 so that, in accordance with the outputs of the front wheel speed sensor 8 and the rear wheel speed sensor 9, the control unit 10 performs the required counting, computing, and decision-making operations, and an output of the control unit 10 is supplied to an actuator 1 which actuates the clutch 4.

Figure 2:
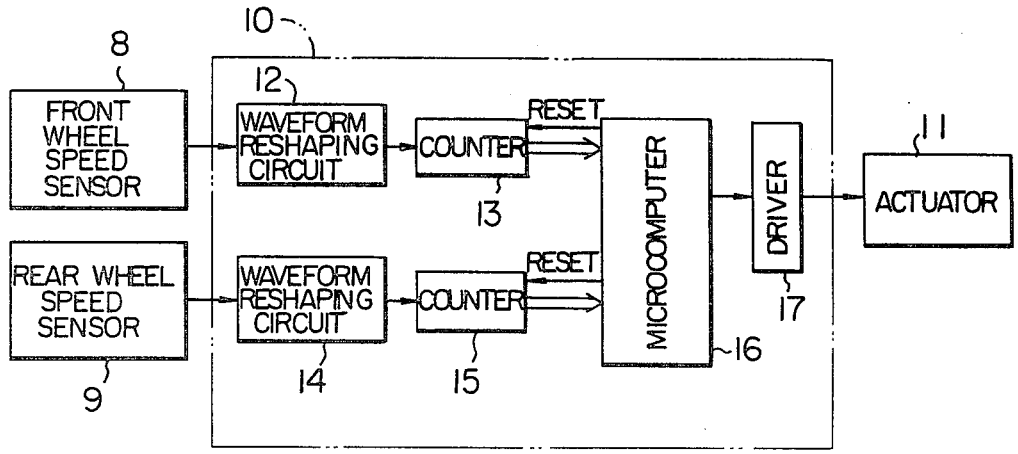
FIG. 2 is a schematic diagram showing details of a control unit shown in FIG. 1.

As shown in FIG. 2, the control unit 10 is designed so that the output of the front wheel speed sensor 8 is applied to a microcomputer 16 through a waveform reshaping circuit 12 and a counter 13, and the output of the rear wheel speed sensor 9 is applied to the microcomputer 16 through a waveform reshaping circuit 14 and a counter 15. The output of the microcomputer 16 is applied to the actuator 11 by way of a driver 17.

Figure 3:
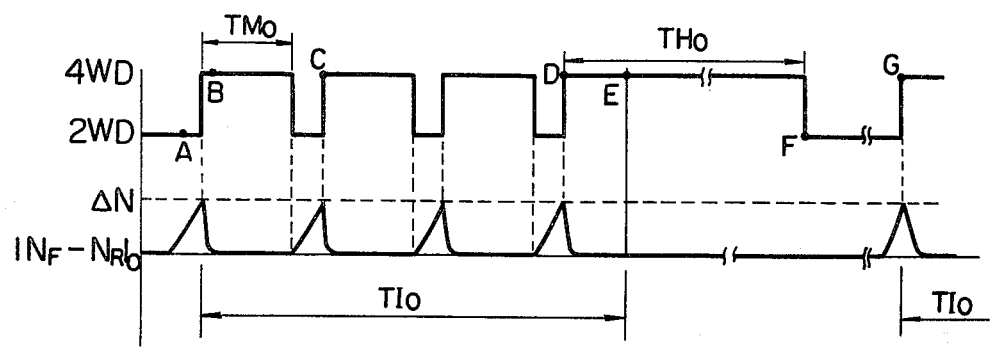
FIG. 3 is a waveform diagram depicting the operation of the microcomputer shown in FIG. 2.

Assuming that $N_F$ represents the front wheel speed obtained from the output of the front wheel speed sensor 8 and $N_R$ represents the rear wheel speed obtained from the output of the rear wheel speed sensor 9, if $|N_F - N_R|$ becomes greater than a given speed difference $\Delta N$, the microcomputer 16 automatically changes the vehicle drive from the two wheel drive mode to the four wheel drive for a time. $TM_O$ stored in the memory of the microcomputer 16 as shown in FIG. 3. After the four wheel drive mode has been automatically changed to the two wheel drive mode at the expiration of the time. $TM_0$, if the value $|N_F-N_R|$ again exceeds the given speed difference $\Delta N$, the two wheel drive mode is automatically changed-over to the four wheel drive mode for the the time period $TM_0$. It is arranged so that if the change-over from the two wheel drive mode to the four wheel drive mode is effected for example, four times within a predetermined time $TI_O$ which is longer than the time $TM_0$, then the microcomputer 16 operates so as to maintain the four wheel drive mode for a given time $TH_0$ which is longer than the time $TM_0$. Preferably, the time $TM_0$ is ten seconds, the time $TI_0$ forty seconds and the time $TH_0$ is five minutes.

Figure 4:
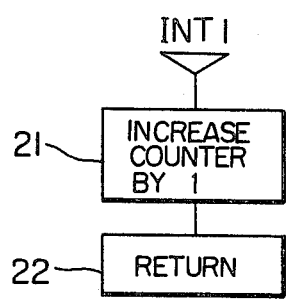

The detailed operation flow of the microcomputer 16 is shown in FIGS. 4 to 6. Flag symbols and counter symbols are first defined as follows:

$FN=\Delta N$ A flag which is set when $|N_F-N_R|\geq \Delta N$;

FH=four wheel drive hold flag which is set when the number of clutch operation exceeds four FS1, FS2=one second flags which are each set at intervals of one second, FTS=ten second flag which is set at intervals of ten seconds;

FF=first operation flag which is set when the clutch is engaged for the first time after it has been disengaged;

FC=count flag which is set when the clutch is engaged for the first time after the expiration of the predetermined time period $TI_0$;

CN=number of clutch operations counter;

TH=counter for counting the hold time after four clutch operations;

TI=counter for counting the time after the time that the flag FC is set;

TM=counter for counting the time after the flag FF is set.

The tasks imposed on the microcomputer 16 may be roughly classified as follows:

(1) Detection of $N_F$ and $N_R$ and decision-making on $|N_F-N_R|\geq \Delta N$;

(2) Counting of TM and decision-making on $TM=TM_0$;

(3) Counting of CN and decision-making on CN=4;

(4) Counting of TI and decision-making on $TI=TI_0$;

(5) Decision-making on the hold, counting of TH and decision-making on $TH=TH_0$;

(6) Outputting a control signal.

The software organization of the microcomputer comprises an interrupt routine INT1 for counting $N_F$ and $N_R$, a timer interrupt routine INT2 for detecting $N_F$ and $N_R$ and making a decision on $|N_F-N_R|\geq \Delta N$ as shown in FIG. 5 and a main routine shown in FIG. 6 for executing the above mentioned tasks (2) through (6).

Each of the counters 13 and 14 comprises a four-bit counter and the interrupt routine shown in FIG. 4 is started each time the counter reaches the full count. then the interrupt is initiated, a step 21 increases by one a four-bit front wheel counter in the microcomputer 16 when the interrupt is caused by the counter 13 and increases by 1 a 4-bit rear wheel counter in the microcomputer 16 when the interrupt is caused by the counter 15. As a result, the front and rear wheel counters in the microcomputer 16 respectively form the higher four-bits of the counters 13 and 15, thereby providing an eight-bit front and rear wheel counters. After the step 21 has increased the counter by one, a step 22 returns the processing to the main routine.

The timer interrupt routine INT 2 shown in FIG. 5 is initiated at intervals of 10 m sec. When the timer interrupt routine INT 2 is initiated, a step 23 determines whether the interruptions reaches ten times. If the decision is YES, a step 24 fetches a front wheel speed $N_F$ from the counter 13 and the front wheel counter and a rear wheel speed $N_R$ from the counter 15 and the rear wheel counter. Then, a step 25 determines whether $|N_F-N_R|\geq \Delta N$. If the decision is YES, a step 26 sets the $\Delta N$ flag FN and generates a clutch-on command to operate the vehicle in the four wheel drive mode and then the above four counters are reset at step 26B. If the decision of the step 25 is NO, a step 27 resets the flag FN and then a step 26B resets the counters provided with $N_F$, $N_R$. The contents of the flag Fn are used by the main routine. When the step 23 judges to be NO, the routine jumps to a step 28A, wherein a count of the one second counter is increased by one and a step 28B determines whether one second has elapsed. In other words, this interrupts routine is initiated at intervals of 10 m sec. and thus one second is reached when the count of the one second counter reaches one hundred. The step 28B determines whether the count of the 1 second counter has reached one hundred. If the decision of the step 28B is YES, a step 29 sets the one second flags FS1 and FS2 and also resets the one second counter. Then, a step 30A increases the count of the ten seconds counter by one and a step 30B determines whether the ten seconds counter has attained ten seconds or the count of the ten seconds counter has reached ten. If the decision is YES, a step 31 sets a ten seconds flag FTS and a step 32 returns the processing to the main routine. If the decision of the step 28B or 30B is NO, the step 32 returns the processing to the main routine. The one second flags FS1 and FS2 are used by the timer counters TI and TM of the main routine, and the ten seconds flag FTS is used when the timer counter TH of the main routine counts the time.

With the flow of the main routine shown in FIG. 6, first a step 34 clears the RAM and performs the initialization of the interrupt flags, etc., and the next step 35 determines whether the hold time is going on. If FH=1, it is an indication that the hold time $TH_0$ of FIG. 3 is going on and in this case, a step 36A determines whether the ten seconds flag FTS has been set. If the decision is YES, a step 36B increases the count of the hold time counter TH by 1 and also resets the ten seconds flag FTS, and then a step 36C determines whether the contents of the hold time counter TH have attained the hold time $TH_0$. If the decision is YES, the processing is returned to the beginning of the main routine so that all the elements are reset and the processing is started again from the initialized state. If the decision of the step 36A or 36C is NO, then a step 46 generates a clutch-on signal and the processing is returned to the step 35. In the preferred embodiment, the hold time $TH_0$ is preset to five minutes. Since the flag FTS is set by the step 31 in FIG. 5 at intervals of ten seconds, the decision of the step 35 becomes YES at intervals of ten seconds and the decision of the step 36C becomes when the count of the timer counter TH reaches thirty.

If the step 35 determines that FH=0 or it is not the hold period, a step 38 makes a decision on the number of clutch operations so that if CN=4, step 37 sets the hold flag FH and the step 46 generates a clutch-on signal. Contrary, if CN≠4, a step 39 makes a decision on the time counter TI. If $TI\geq TI_0$, a step 41 clears the clutch operations counter CH, resets the count flag FC and then transfers to a step 42. If $TI<TI_0$, a step 40A determines whether the one second flag FS1 has been set. If the decision is YES, a step 40B increases the count of the timer counter TI by one and also resets the flag FS1, and then a step 40C sets the count flag FC. If the decision of the step 40A is NO, the processing proceeds to the step 40C. Since the one second flag FS1 is set by the step 29 at intervals of one second, the decision of the step 40A becomes YES at intervals of one second and the count of the timer counter TI is correspondingly increased. In this embodiment the time $TI_0$ is selected to be forty seconds and thus the decision of the step 39 becomes YES when the count of the time counter TI reaches forty.

If the step 42 determines that the first operation flag FF is 1, a step 43 makes a time decision on the timer counter TM. If $TM \neq TM_0$, a step 45A determines whether the one second flag FS2 has been set. If the decision is YES, a step 45B increases the count of the timer counter TM by one, resets the 1 second flag FS2 and then transfers to the step 46. If the decision of the step 45A is NO, it represents a condition where the count of the timer counter TM has been increased finally and one second has not elapsed as yet and thus the step 45A transfers directly to the step 46. If the step 43 determines that $TM = TM_0$, then a step 44 resets the first operation flag FF and transfers to a step 47 which in turn generates a clutch-off signal. If the step 42 determines that $FF \neq 1$, a step 48 makes a decision on the $\Delta N$ flag FN so that if $FN = 1$, a step 49 sets the first operation flag FF and a step 50 clears the timer counter TM. Then, a step 51 increases the count of the clutch-on operations counter CN by one and a step 52A determines whether the count flag FC has been set. If the decision is NO, it is an indication that the expiration of the clutch-on operations count time $TI_0$ has been determined by the step 39 and the count flag FC has been reset by the step 41, a step 52B clears the timer counter TI and transfers to the step 46. If the decision of the step 52A is YES, it is an indication that the timer counter TI has not reached $TI_0$ and thus the step 52A transfers directly to the step 46.

In the above-described flow diagrams, the flow of the main routine at the points A, B, C, D, E, F and G, respectively, of FIG. 3 is as follows;

The point A: step 35→step 38→step 39→step 40→step 42→step 48→step 47→step 35;
The point B: step 35→step 38→step 39→step 40→step 42→step 43→step 45→step 46→step 35;
The point C: step 35→step 38→step 39→step 40→step 42step 48→step 49→step 50→step 51→step 52A→step 46→step 35;
The point D: step 35→step 38→step 37→step 46→step 35;
The point E: step 35→step 36→step 46→step 35;
The point F: step 35→step 36A→step 36B→step 36C→step 34→step 35;
The point G: step 35→step 38→step 39→step 41→step 42→step 48→step 49→step 50→step 51→step 52A→step 52B→step 46→step 35.

From the foregoing it will be seen that in accordance with the invention the control is performed so that the clutch is operated for the predetermined time, $TM_0$ when the speed difference between the front and rear wheels during the two wheel drive mode exceeds $\Delta N$, and if the count of the clutch operation counter CN becomes four or more during the predetermined time $TI_0$ the clutch is operated for the predetermined time $TH_0$ thereby holding the four wheel drive mode. As a result, due to the fact that, upon occurrence, for example, of four automatic clutch change-over operations, it is determined that a bad road surface condition continues for some time and the four wheel drive mode is held for a predetermined time, the number of clutch change-over operations is reduced and the danger of the clutch being thermally damaged is reduced and the wearing of the clutch 4 is also reduced. Also, in accordance with the invention the number of clutch change-over operations is reduced thus reducing the hunting of the four wheel drive mode and the two wheel drive and improving the drivability and running characteristic of the vehicle.

While, in the embodiment, the holding of the four wheel drive mode is effected when the clutch 4 is automatically changed over four times, it is needless to mention that the number of automatic clutch change-over operations is not limited to four. Experimentally, the clutch must be changed over at least three times and in this case it is sufficient if the value of $TI_0$ is at least three times that of $TM_0$.

As described hereinabove, in accordance with the automatic driving wheel change-over apparatus of this invention the change-over between the two wheel drive mode and the four wheel drive mode can be effected automatically in accordance with the road surface conditions and the number of change-over operations can be reduced as far as possible, thereby protecting the clutch and improving the drivability and running characteristic of the vehicle.

We claim:

1. An automatic driving wheel change-over apparatus comprising:
   first wheels and second wheels driven by an engine;
   clutch means for effecting a change-over between a drive by said first wheels and a drive by said first and second wheels;
   first detecting means for detecting a rotational speed of said first wheels;
   second detecting means for detecting a rotational speed of said second wheels;
   means for determining a difference between the rotational speed signals respectively detected by said first and said second detecting means is greater than a predetermined value;
   first acuating means responsive to an output of said means for determining for acutating said clutch means and to drive said first and second wheels for a predetermined time period;
   counting means for counting a number of times said first actuating means is operated during a second predetermined time period which is longer than said first predetermined time period; and
   second actuating means for actuating said clutch means for a third predetermined time period which is longer than said first predetermined time period to thereby drive said first and second wheels when said counting means reaches a predetermined value.

2. An apparatus according to claim 1, wherein said counting means is adapted to count up to at least three.

3. An apparatus according to claim 2, wherein said second predetermined time period is greater than three times said first predetermined time period.

* * * * *